Patented Jan. 16, 1934

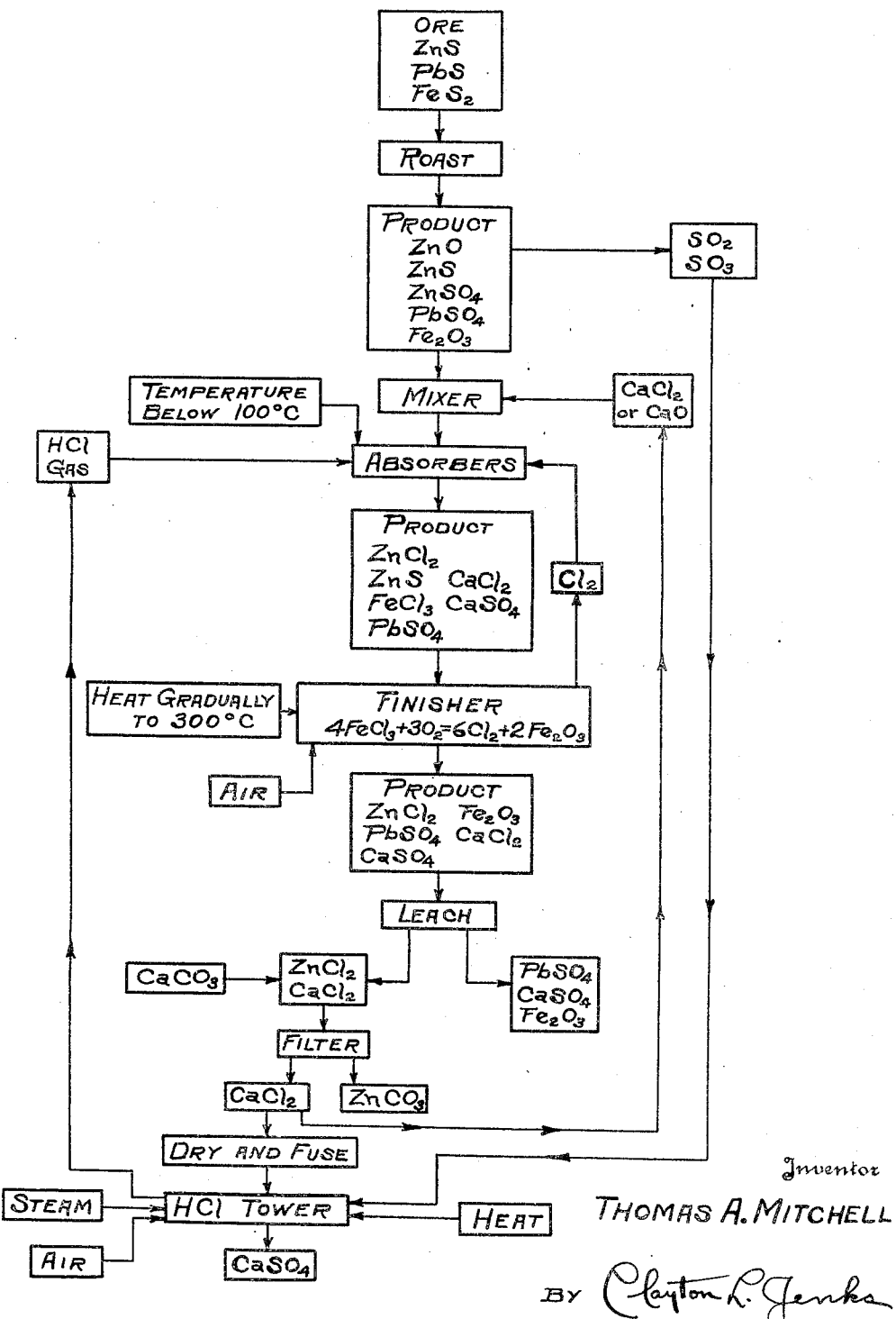

UNITED STATES PATENT OFFICE 1,943,335

1,943,335
METHOD OF CHLORIDIZING METALLURGICAL ORES

Thomas A. Mitchell, Denver, Colo., assignor to Lafayette M. Hughes, Denver, Colo.

Application March 4, 1931, Serial No. 520,050
Renewed February 20, 1933

17 Claims. (Cl. 75—67)

This invention relates to a method of roasting and chloridizing metallurgical sulfide ores and particularly to a cyclic method which results in an efficient extraction of ore metal values.

The common sulfide ores contain such metals as zinc, lead, copper, tin, cadmium, iron, silver, manganese and magnesium in which the sulfide crystals are interspersed with one another and with the quartz, silicates, etc., forming the ore gangue. These behave in various ways when subjected to a standard oxidizing roast, as is commonly practiced for removing sulfur from the ore prior to a smelting operation. For example, lead goes largely to the sulfate form, while zinc sulfide is oxidized partly to zinc sulfate and partly to zinc oxide. In order to break up the zinc sulfate that inevitably forms during the early stages of such a roasting operation, it has been customary to dead roast the material at a white heat, and this slow and expensive step has had the detrimental effect of producing such difficultly treated compounds as zinc ferrite and zinc silicate. Also, the presence of residual sulfide sulfur in the ore has heretofore meant a loss of metal and other materials in the subsequent attempts to recover the ore metal values. For example, any attempt at chloridizing such a roasted ore results in a loss of chlorine, due partly to the presence of reactable sulfate radical and unroasted sulfide sulfur which react with the chlorine either directly or indirectly and keep it from uniting with the ore metals. Moreover, some of the chlorine or chloride ion is lost in reaction with undesired ingredients of the ore.

It is the primary object of my invention to provide a method of recovering metal values from ores, and especially the complex sulfide ores, which involves a roasting operation followed by a chloridizing treatment of the desired ore metal values, and particularly to provide a method of this type which is efficient and economical and will give a very high extraction of the desired ore metals.

Another object of this invention is to provide a process of chloridizing the ore metal values in which the reagents may be formed from various ingredients present in the ore batch.

A further object is to provide a method of so treating a standard roasted ore that a metal, such as zinc, which has formed both an oxide and a sulfate may be recovered as a chloride, and particularly a method which involves fixing the available sulfur trioxide present or formed during the chloridizing operation and preventing it from sulfating a desired ore metal value, and thereby insuring that a high yield of the desired chloridized metal is obtained.

With these and other objects as will be apparent to one skilled in this art, this invention resides in the combination of process steps set forth in the specification and covered by the claims appended hereto.

Referring to the drawing, I have there illustrated diagrammatically one method involving this invention for treating an ore containing zinc, lead and iron sulfides as well as various impurities associated therewith; but it will be understood from the following disclosure that the process applies to other ore metals, such as copper, tin, cadmium, silver, manganese and magnesium.

In accordance with this invention, I propose to subject such a sulfide ore to an oxidizing roast, in a manner well known to those skilled in the art, and preferably so as to obtain a large yield of zinc oxide and iron oxide. The operation should be so conducted and the temperature so controlled as to avoid, in so far as possible, the formation of a sinter or a vitreous mass or of an unnecessarily high percentage of difficultly chloridized compounds. It is not necessary or desirable to dead roast the material or to get all of the sulfur out of the ore, but it is satisfactory if there remains a low content of sulfide sulfur combined with ore metal values. It is preferable, however, to hold the percentage of residual sulfide sulfur to 5% or so, since this imposes less burden on the chloridizing reagent later used. The roasting operation may be carried on at a comparatively low temperature, and for some ores I have found it sufficient to allow the material to burn autogenously or attain that temperature at which the sulfide sulfur burns readily.

The roasting operation results in the formation of zinc oxide and zinc sulfate with a residue of unroasted zinc sulfide, while the lead goes to the sulfate form and iron and copper appear as oxides. Various complex reactions may also take place, resulting in the formation of such difficultly chlorided compounds as zinc ferrite or ferrate and silicate, but these are readily treated by the subsequent steps of my process. In the presence of ferric oxide, which acts as a catalyzer, a considerable proportion of the sulfur dioxide evolved when the sulfide ore burns goes to the sulfur trioxide form and may be recovered for use as desired.

As will be appreciated the roasted material, containing both zinc oxide and zinc sulfate, is not in proper condition for chloridizing by standard methods, and herein lies one of the primary difficulties met by previous workers in this art.

In accordance with my invention, I have discovered that this roasted material may be chloridized efficiently if the chloridizing action is carried on in a substantially dry condition after the roasted material has been intimately mixed in a finely divided condition with a finely divided alkaline earth reagent, such as the chloride, oxide, hydroxide or carbonate of one of the alkaline earth metals, calcium, strontium and barium, which is capable of combining with the available sulfate radical present or formed during the subsequent chloridizing operation and of forming an insoluble alkaline earth metal sulfate therewith. Of these alkaline earth metal reagents, I preferably use calcium chloride or calcium oxide which will combine with any available sulfate radical, such as is found in zinc sulfate, or which will combine with sulfur trioxide formed during the chloridizing operation to produce calcium sulfate and thereby fix this sulfate radical as an insoluble material and permit chloridization of such metals as zinc.

The chloridizing reagent to be employed in this process will depend upon the nature of the materials present in the ore as well as upon the preliminary treatment employed. In the process illustrated, I employ hydrochloric acid gas which is capable of reacting with and chloridizing the easily treated portions of the ore. In a further stage chlorine is employed for chloridizing those compounds of the ore, such as zinc ferrite or ferrate, zinc sulfide and zinc silicate, which are not converted in the preliminary chloridizing stage. One of the problems involved in such a chloridizing process is that when chlorine reacts with zinc sulfide, for example, sulfur chloride is formed which is converted in an oxidizing atmosphere to sulfur trioxide, and this tends to form a sulfate of such metals as zinc and so prevent chloridization thereof. If, however, an alkaline earth metal compound as above specified is present in sufficient quantity and in intimate contact with the ore material during this chloridizing step, then this alkaline earth material serves to fix the sulfur trioxide or sulfate radical and prevent its attacking the zinc. While the process is carried on with the materials in a substantially dry condition, it is of course understood that moisture is present to a certain extent and may enter into or aid the reactions; but the process is essentially a dry process as distinguished from one carried on in an aqueous bath.

For the sake of illustrating the invention more fully, let us assume that the ore to be treated initially contains the following ingredients in the proportions specified, in addition to various impurities, such as the gangue, and other materials in small amounts.

| | Per cent by weight |
|---|---|
| Zinc | 30 |
| Lead | 10 |
| Copper | 4 |
| Magnesium | 2 |
| Sulfur | 30 |

The copper and magnesium will be ignored largely in the following discussion since they act about the same as the zinc. Such an ore may be roasted incompletely so that only about half the zinc sulfide has been oxidized to the oxide form. In the roast there are also such compounds as the ferrite or ferrate, silicate, sulfide and sulfate of zinc and other metals. The lead is present largely as lead sulfate and any iron is largely in the condition of ferric oxide.

In order that there may be alkaline earth metal available for all of the sulfur which is capable of combining with the zinc as zinc sulfate, I propose to analyze the roasted material and add to it an amount of calcium chloride or calcium oxide or other suitable alkaline earth metal material which is molecularly equivalent to the total sulfur in the ore, or that proportion which is found to form sulfates with the zinc or other metal to be protected. If one half of the zinc still remains as a sulfide, then in accordance with the molecular weights I provide a mixture of the roasted material and calcium chloride or oxide which contains 26% of calcium chloride or 13% of calcium oxide for the purpose of fixing the available sulfate radical. If the total sulfur content is assumed to be 3% there are 60 lbs. of sulfur present in a ton of ore. Hence in accordance with the molecular weights of sulfur and calcium oxide it is found that 105 lbs. of lime is required per ton of roasted material.

It is to be understood that the calcium chloride will react with zinc sulfate present to form zinc chloride and a portion of the chlorine of the calcium chloride is utilized in this manner, thus leaving only the zinc sulfide, ferrite or ferrate and silicate as well as any other difficultly chloridized compounds for treatment by the chlorine gas which is subsequently added. Hence by utilizing calcium chloride instead of calcium oxide I thereby cut down the amount of the chlorine required for the total chloridizing action. I have in the above discussion ignored the fact that magnesium and other compounds may be present which will require chlorine for their chloridization. If calcium oxide, hydroxide or carbonate is used instead of calcium chloride, then this material may absorb chlorine, derived as hereinafter explained, and be converted to calcium chloride.

The preferred method of chloridizing the roast in the final stage of attacking the difficultly chloridized portions involves the use of chlorine gas and preferably nascent chlorine. This reagent is preferably obtained by heating ferric chloride in the presence of the ore material and in an oxidizing atmosphere to a temperature at which ferric chloride is not stable, whereby nascent chlorine is formed. For the purpose of obtaining this ferric chloride I prefer to form it in situ from the iron compound which is commonly associated with the ore material, but if there is not sufficient iron compound present for the purpose then iron sulfide or oxide or other suitable reagent may be added for this purpose. Iron sulfide will of course be added prior to the roasting operation to form ferric oxide. The iron oxide will be converted to ferric chloride in the intermediate chloridizing step involving preferably the use of hydrochloric acid gas introduced for this purpose as well as for the conversion of the zinc oxide or other easily chloridized portions of the roasted material to the chloride form.

The two-stage chloridizing operation is preferably carried on in two or more long, inclined, rotary tubes through which the roasted material is passed in counterflow relation to any chloridizing gas utilized. The first of these tubes is known as the absorber because of the absorption of hydrochloric acid gas therein, while the last tube is known as the finisher where the chloridizing operation is finished.

The roasted ore mixture after it has been mixed with the calcium oxide or calcium chloride is passed into the absorber and hydrochloric acid gas is introduced at the lower end of the rotary tube. As the tube is rotated the material is agitated by means of baffles and is showered through the hydrochloric acid gas and any zinc and calcium oxides are converted to the chlorides along with other easily chloridized materials. When the zinc oxide has been substantially completely chloridized, the iron oxide will then absorb chlorine and be converted in the oxidizing atmosphere to ferric chloride. As above explained, if calcium chloride has been added to the mixture then this will aid the hydrochloric acid in converting the zinc sulfate to a chloride. The alkaline earth metal oxide or carbonate acts similarly. The iron oxide is not attacked in the presence of an excess of zinc oxide, hence the zinc oxide conversion must be carried substantially to completion in order to produce the ferric oxide. The temperature in the absorbers is kept below the temperature at which ferric chloride will decompose so that this material may be formed. The oxides of other metals, such as silver, cadmium, manganese and magnesium, will of course take up the hydrochloric acid to form chlorides as well.

Owing to the fact that zinc chloride is highly soluble in water and forms a sticky, gummy mass which may prevent effective chloridization of other ore ingredients, it is sometimes desirable that some of the water of the reaction be removed from the absorber. This water is derived in part from the reactions between the hydrochloric acid and the metal oxides, such as:

$$ZnO + 2HCl = ZnCl_2 + H_2O$$

Consequently, the temperature of this absorption apparatus is kept reasonably high, although below 100° C. or the dissociation point of ferric chloride and preferably around 80° C., so that some water will be removed on the current of gases flowing through this chamber. It of course will be understood that any excess of hydrochloric acid which is carried away with the moisture may be suitably recovered. Also, any excess of chlorine coming off from the finisher may be used in the absorber, as indicated in the drawing.

The product issuing from this absorber contains zinc, calcium and iron chlorides, lead sulfate, calcium sulfate and the unconverted materials, such as zinc sulfide, zinc ferrite or ferrate, zinc silicate and the like. This product is now passed to the finisher for the final chloridizing treatment. The ferric chloride formed in the absorber has by this time been dissolved to some extent in the moisture present in the chamber. Also as it is heated in the finishing chamber it melts to some extent in its water of crystallization. Hence, a solution of ferric chloride is in intimate contact with the particles of the ore material. This makes it possible for the ferric chloride to react to some extent directly with the zinc sulfide and other materials to convert them to chlorides.

The lower end of the finisher chamber is heated by a suitable medium, such as a jacket carrying hot gas, and the temperature is maintained well above the point at which ferric chloride dissociates, but will be preferably maintained below that temperature at which the ore ingredients will volatilize or dissociate. For the ore specified, a temperature of 250° to 300° C. is suitable. Air is introduced into this chamber so as to produce oxidizing conditions. Consequently, the ferric chloride is gradually decomposed as it passes towards the hot end of the finisher and forms nascent chlorine and ferric oxide, and this nascent chlorine reacts readily with the chloridizable portions of the ore with which it is in intimate contact. The various reactons which take place in the finisher chamber may be simply illustrated by the following equations:

$$4FeCl_3 + 3O_2 = 6Cl_2 + 2Fe_2O_3$$

$$ZnS + 2Cl_2 = ZnCl_2 + SCl_2$$

$$SCl_2 + 2H_2O + O_2 = 2HCl + H_2SO_4$$

$$H_2SO_4 + CaCl_2 = CaSO_4 + 2HCl$$

Similar reactions will take place between the chlorine and zinc ferrite, zinc silicate, etc. with the result that the nascent chlorine will effectively chloridize the various zinc compounds in the ore. The hydrochloric acid formed will react with metal oxides present.

In order to determine the amount of chlorine or other chloridizing agent required, the roasted ore may be analyzed to determine the amount of zinc and other chloridizable metals, such as copper and magnesium, which are present, and the amount of chlorine required will be calculated as ferric chloride. If calcium chloride is to be added as a sulfur fixing reagent, then the amount of chlorine which can be supplied by this reagent will be subtracted from the amount of chlorine required from the ferric chloride or other reagent employed. It of course is desirable that there be an excess of the chloridizing agent in order to insure that the reaction goes substantially to completion. Ferric chloride may be added directly to the roasted material for the production of the nascent chlorine or this chlorine may be added directly as a gas instead of being formed in the presence of the ore.

If calcium oxide is used, then this reacts directly with any sulfate radical or sulfur trioxide to form calcium sulfate and zinc oxide which must be chloridized by the hydrochloric acid, while if calcium chloride is employed it will react with the zinc sulfate to form zinc chloride directly. Thus the alkaline earth metal chloride serves as a chloridizing agent as well as a fixer of the sulfate radical.

In order to separate the materials coming from the finisher, various steps may be employed. One method is to leach the material with water, in which case the zinc chloride and any excess of calcium chloride will go into solution, while the iron oxide, lead sulfate and calcium sulfate will remain with the residue, thus effectively separating the undesired iron and calcium compounds from the more desirable materials and leaving the lead for subsequent recovery. The lead sulfate, together with such lead chloride as may have been formed, may be easily removed by leaching the residue with hot sodium chloride solution and then cooled to precipitate lead chloride crystals therefrom. The zinc chloride may be separated from the solution by precipitation, as by adding calcium carbonate to the solution, thus forming zinc carbonate and leaving calcium chloride in solution. This calcium chloride solution may be evaporated and the dry salt returned to the initial stages of the process. Or, it may be utilized with the sulfur dioxide and trioxide gases derived from the roasting operation to form hydrochloric acid, which is used in the absorber chamber. In order to make this hydrochloric acid, the dried calcium chloride may be fused and made into lump form and then placed in a tower, where the sulfur gases, together with oxygen and steam, are passed over this lump material at a temperature at which hydrochloric acid gas will be evolved therefrom with the formation of calcium sulfate.

It will now be understood that calcium chloride introduced to the absorber chamber with the roast serves as a supply of chlorine for chloridizing the sulfated zinc portion of the ore. Also the alkaline earth metal chloride or oxygen compound is available to take up any sulfate radical which is free and would normally combine with the zinc; hence this reagent compels the zinc to go to the chloride form. By this process, I utilize the comparatively inexpensive hydrochloric acid for the easier stages of the chloridizing operation and employ the very strong reagent nascent chlorine for the difficult parts of the treatment. As a result I get a high extraction of the ore metal values.

Other treatments may be employed, of course, depending upon the nature of the ingredients of the ore, it being understood that the process is broadly applicable to many complex and simple ores, as will be understood by one skilled in the art in view of the above disclosure. It will also be apparent that no considerable amount of chlorine is wasted in this reaction since any chlorine used to form ferric chloride is not only recovered but put to useful work. The chloride ion taken up by the calcium is likewise employed in the other stages of the process. The success in this processs resides primarily in my being able to fix the free sulfur trioxide or sulfate radical present in the roasted ore mixture or which is formed during the chloridizing operation and in my ability to use cheap chemicals and to get the chlorine into a condition where it can do effective work. It will also be understood that chlorine may be used in the absorber apparatus in place of hydrochloric acid although this may not be as economical a reagent. In that case the chlorine would not only act directly upon the ore values but also cause the ferric chloride there formed to serve as a carrier of chlorine and chloridize other constituents of the ore.

It is to be understood that the expression roasting the ore "in the absence of a sulfate fixing reagent", as employed in the claims, refers to the absence of a substantial amount of material adapted for the purpose of fixing the available sulfate radical and does not refer to the accidental presence of such constituents in the raw ore. Also, the expression "chloridizable ore metal" is used in the claims to refer to an ore metal, such as zinc, whose compounds are converted to the chloride during the process.

The claims are to be interpreted as limited to a process in which the ore is first roasted according to standard practice, or in the absence of a sufficient amount of an alkaline earth metal compound or other sulfate fixing reagent, such as lime, which is adapted to fix the available sulfate radical during the roasting operation, and in which the alkaline earth material required during the chloridizing operation is added after the ore has been roasted.

Various features of this chloridizing process are covered broadly by my copending applications Serial Nos. 505,579 filed December 30, 1930, 597,627 filed March 8, 1932, and 687,827 filed September 1, 1933.

Having thus described my invention, what I claim as new and desire to secure by Letters Patent is:

1. The method of treating a sulfide ore comprising the steps of roasting the ore under oxidizing conditions to a low sulfide sulfur content and in the absence of a sulfate fixing reagent, adding to the ore a quantity of calcium chloride proportioned in amount to react with all available sulfate radical during the chloridizing operation and causing an ore metal sulfate to be chloridized, and subsequently treating the mass with chlorine and under conditions which produce an ore metal chloride and form calcium sulfate from the available sulfate radical.

2. The method of treating a sulfide ore comprising the steps of roasting it autogenously with air but in the absence of a sulfate fixing reagent, then providing a finely divided, substantially dry mixture of the roasted material and an alkaline earth metal compound added for the purpose which is capable of and proportioned for reacting with the available sulfate radical to form alkaline earth metal sulfate and treating said mixture with hydrochloric acid gas and chloridizing an ore metal sulfate in the presence of said alkaline earth metal compound.

3. The method of treating a zinc sulfide ore comprising the steps of roasting the ore under low temperature conditions and in the absence of a sulfate fixing reagent to produce an ore mixture containing the sulfide, sulfate and oxide of zinc, then adding to and intimately mixing with the roasted material an alkaline earth metal compound which is capable of and proportioned for reacting with available sulfate radical to form alkaline earth metal sulfate, treating the roasted material with hydrochloric acid in amount to chloridize a portion of the ore, and thereafter chloridizing the mass with chlorine in the presence of said alkaline earth metal compound and under conditions tending to produce said alkaline earth metal sulfate.

4. The method of treating an ore containing zinc and iron sulfides comprising the steps of roasting the ore to a low content of zinc sulfide and under conditions which produce a large proportion of iron and zinc oxides and some zinc sulfate, thereafter adding an alkaline earth metal compound which is capable of and proportioned for reacting with the zinc sulfate and all other available sulfate radical to form alkaline earth metal sulfate, treating the mixture with hydrochloric acid to form zinc chloride and ferric chloride and subsequently heating the mixture in an oxidizing atmosphere to a temperature at which the ferric chloride is not stable and causing nascent chlorine to be evolved and difficultly chloridized portions of the ore to be converted to chlorides while the available sulfate radical is fixed as an insoluble alkaline earth metal sulfate.

5. The method of treating a sulfide ore comprising the steps of roasting the ore to a low sulfur content and in the absence of a sulfate fixing reagent, then adding an alkaline earth metal compound which is capable of and is proportioned in excess of that amount calculated to provide alkaline earth metal chloride and fix all of the available sulfate radical during chloridization, treating the mixture of roasted ore and alkaline earth metal compound with hydrochloric acid in quantity sufficient to chloridize an ore metal oxide, chloridizing a residual ore metal sulfur compound in the presence of the alkaline earth metal chloride, converting the sulfur trioxide derived from the roasting operation to form sulfuric acid and treating the residual alkaline earth metal chloride therewith to form hydrochloric acid for use in the process.

6. The cyclic method of treating a sulfide ore comprising the steps of continuously roasting the ore to a low sulfur content in the absence of a sulfate fixing reagent and deriving sulfur oxygen gases therefrom, treating the roasted material with hydrochloric acid and chloridizing it in the presence of sufficient calcium chloride to form an ore metal chloride and to produce calcium sulfate with the available sulfate radical, separating residual calcium chloride from the ore metal values, treating it to form hydrochloric acid gas and returning said gas to chloridize the roasted ore.

7. The method of chloridizing a sulfide ore comprising the steps of roasting the ore in a finely divided condition and in the absence of a sulfate fixing reagent, while maintaining a low temperature to provide a non-sintered material containing ore metal oxide and a considerable amount of residual ore metal sulfide, adding to the roasted ore an alkaline earth metal compound capable of and proportioned for reacting with all of the available sulfate radical present or formed during the chloridizing process, subjecting the mixture in a substantially dry condition to the action of a chloridizing agent capable of forming a chloride of the residual ore metal sulfide, while the available sulfate radical is fixed as an insoluble alkaline earth metal sulfate, and thereafter separating the soluble ore metal chloride from the insoluble materials.

8. The method of chloridizing a sulfide ore comprising the steps of roasting the ore in a finely divided condition and in the absence of a sulfate fixing reagent, while maintaining a low temperature to provide a non-sintered material containing ore metal oxide, a considerable amount of residual ore metal sulfide and difficultly chloridizable compounds and thereafter mixing the material in a finely divided condition with an alkaline earth metal compound capable of and proportioned for reacting with any available sulfate radical formed or present during the process and then subjecting the mixture in a substantially dry condition to the action of a chloridizing agent capable of forming an ore metal chloride from said residual sulfide, while maintaining the temperature sufficiently low to prevent decomposition or volatilization of an ore metal chloride, whereby said compound serves to fix the available sulfate radical as an insoluble sulfate and prevent the formation of a sulfate of said ore metal.

9. The method as covered by claim 8 in which chlorine gas is employed to react with the residual sulfide and other difficultly chloridizable compounds and calcium chloride serves to fix as calcium sulfate the available sulfate radical derived by reaction of chlorine with the residual sulfide.

10. The method of chloridizing a sulfide ore comprising the steps of subjecting it to a standard oxidizing roast to burn off a considerable portion of the sulfide sulfur and without regard to the formation of the sulfate of an ore metal, thereafter mixing the roasted ore in finely divided condition with an alkaline earth metal compound which is capable of and is proportioned for fixing as an insoluble sulfate all of the available sulfate radical which is present and developed during chloridization, and treating the mixture in a substantially dry condition with a chloridizing reagent and converting the residual chloridizable sulfides and sulfates to chlorides in the presence of the alkaline earth material.

11. The method of chloridizing an ore containing a metal sulfide which roasts to both the oxide and sulfate comprising the steps of roasting it with air to burn off a considerable portion of the sulfide sulfur and forming a roasted product containing the ore metal sulfate, mixing intimately therewith an alkaline earth metal compound which is capable of and proportioned for fixing the available sulfate radical as an insoluble sulfate, treating the mixture in a substantially dry condition with a chloridizing reagent and converting the residual ore metal sulfide and sulfate to the chloride form and thereby producing said chloride and alkaline earth metal sulfate, and thereafter dissolving the soluble ore metal chloride and recovering it substantially free from its sulfate.

12. The method of claim 10 in which the chloride of calcium, strontium or barium serves as the reagent which fixes the available sulfate radical during the chloridizing operation.

13. The method of claim 10 in which a complex sulfide ore is roasted with air under low temperature conditions which leave a considerable amount of ore metal sulfate and sulfide in the ore, after which the roasted ore is treated with chlorine in the presence of air and the alkaline earth material to convert the residual sulfate and sulfide to a chloride and fix the available sulfate radical as an insoluble alkaline earth metal sulfate, and the ore metal chlorides are thereafter leached from the ore residue and thus separated from said alkaline earth metal sulfate.

14. The method of treating a complex sulfide ore according to claim 10 in which the roasted ore in intimate mixture with an alkaline earth metal oxide is treated with hydrochloric acid gas to convert the oxides of the ore metals and alkaline earth metal to chlorides and the chloridizable sulfates are converted to chlorides by means of the alkaline earth metal chloride, after which the chlorides in the ore are dissolved and thus separated from the ore residue containing the alkaline earth metal sulfate.

15. The method of treating a complex ore containing the sulfides of iron and other ore metals comprising the steps of roasting the ore in the absence of a sulfate fixing reagent and forming iron oxide and a mixture of oxides, sulfides and sulfates of the ore metals, adding thereto an alkaline earth metal compound which is capable of and is proportioned for fixing the available sulfate radical during the chloridizing operation, treating the mixture in a substantially dry condition with a chloridizing reagent which converts the iron oxide to iron chloride and thereafter heating the material with air to a temperature at which the iron chloride is not stable and a gaseous chlorine bearing reagent is developed therefrom in the presence of the chloridizable ingredients of the ore material.

16. The method of claim 15 in which the ore is roasted under standard low temperature oxidizing conditions to produce ferric oxide and the latter is converted to ferric chloride by treatment with hydrochloric acid gas, after which the ore containing the ferric chloride is heated with air to form nascent chlorine which attacks the residual sulfides in the presence of the alkaline earth material and converts them to chlorides.

17. The method of chloridizing an ore containing zinc and iron sulfides according to claim 15 in which the ore is roasted at a low temperature and zinc sulfate, sulfide and oxide together with ferric oxide are present in the roasted ore, and in which the mixture of roasted ore and alkaline earth material is treated with gaseous chlorine bearing reagents which cooperate with the alkaline earth material to convert zinc oxide, sulfide and sulfate to the chloride.

THOMAS A. MITCHELL.